US 6,550,871 B1

(12) United States Patent
Böhm et al.

(10) Patent No.: US 6,550,871 B1
(45) Date of Patent: Apr. 22, 2003

(54) METHOD AND SYSTEM FOR CONTROLLING AN ELECTROMECHANICALLY ACTUATED BRAKE FOR MOTOR VEHICLES (75) Inventors: Jürgen Böhm, Im Bangert (DE);
Oliver Hoffmann, Frankfurt (DE);
Rainer Oehler, Darmstadt (DE);
Jochen Leidech, Dramstadt (DE);
Joachim Nell, Hanau (DE); Peter Willimowski, Bruchköbel (DE)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/913,337
(22) PCT Filed: Jan. 18, 2000
(86) PCT No.: PCT/EP00/00664
§ 371 (c)(1), (2), (4) Date: Mar. 4, 2002
(87) PCT Pub. No.: WO00/48885
PCT Pub. Date: Aug. 24, 2000

(30) Foreign Application Priority Data

Feb. 19, 1999 (DE) .......................... 199 06 909
Jun. 4, 1999 (DE) .......................... 199 25 607

(51) Int. Cl.$^7$ ............................................. B06T 15/14
(52) U.S. Cl. .......................................... 303/20; 188/156
(58) Field of Search ................................. 188/156, 158, 188/162; 303/3, 7, 15, 20

(56) References Cited

U.S. PATENT DOCUMENTS

| 4,163,586 | A | | 8/1979 | Snyder | |
|---|---|---|---|---|---|
| 5,366,280 | A | | 11/1994 | Littlejohn | |
| 5,962,997 | A | * | 10/1999 | Maisch | 318/108 |
| 6,000,507 | A | * | 12/1999 | Bohm et al. | 188/158 |
| 6,199,670 | B1 | * | 3/2001 | Shirai et al. | 188/158 |
| 6,209,689 | B1 | * | 4/2001 | Bohm | 188/156 |
| 6,299,261 | B1 | * | 10/2001 | Weiberle et al. | 303/20 |
| 2002/0047305 | A1 | * | 4/2002 | Yokoyama et al. | 303/163 |

FOREIGN PATENT DOCUMENTS

| DE | 195 36 694 | 4/1997 |
|---|---|---|
| DE | 197 42 920 | 4/1999 |
| EP | 638 457 | 2/1995 |
| EP | 894 685 | 2/1999 |

* cited by examiner

Primary Examiner—Christopher P. Schwartz
(74) Attorney, Agent, or Firm—Brinks Hofer Gilson & Lione (57) ABSTRACT A method and system for controlling a brake for motor vehicles. The present invention relates to a method as well as a system for controlling a brake for motor vehicles, which can be electromechanically actuated by means of an actuator, consisting of an electric motor as well as a drive mechanism positioned downstream of the electric motor. In order to be able to increase motor speed under certain operating conditions, i.e. according to demand, without reducing the available torque, the invention provides for the slope of the speed-torque characteristic curve of the electric motor (4) to be modified by weakening components of the electromagnetic field of said electric motor (4), which affect the dynamics of same, in such a way that a higher speed ($\omega'_1$) is obtained at the same torque ($M_1$).

11 Claims, 4 Drawing Sheets

METHOD AND SYSTEM FOR CONTROLLING AN ELECTROMECHANICALLY ACTUATED BRAKE FOR MOTOR VEHICLES

BACKGROUND OF THE INVENTION

The present invention relates to a method and a system for controlling a brake for motor vehicles, which can be electromechanically actuated by means of an actuator consisting of an electric motor and a drive mechanism positioned downstream of the electric motor.

The present invention relates to a method and a system for controlling a brake for motor vehicles, which can be electromechanically actuated by means of an actuator consisting of an electric motor and a drive mechanism positioned downstream of the electric motor.

A type of method or system for controlling an electromechanically actuated brake, for example, has been shown in the German published application DE 195 36 694 A1. The special characteristic of the system known in the prior art is that means are provided, which determine the position of an actuating element relative to the actuator, that a controller is provided which can switch between a first and a second control mode, with the actual position of the actuating element matching a set value in the first control mode and an actual signal representing a delay matching a desired signal in the second control mode, and that a decision circuit activates the first or the second control mode depending on a decision criterion.

In addition to the available space as well as a defined power input (basically the peak and continuous current should be as low as possible), above all the following requirements regarding the performance of the brake need to be taken into consideration when designing or dimensioning an electric motor suitable for the aforementioned electromechanically actuated brake (definition of the electric motor characteristic curve):

1) The distance between friction lining and brake disc (so called free travel) should be overcome as quickly as possible. Hence, relatively large distances have to be covered with a low level of force, which means that the electric motor has to run at as high a speed as possible.
2) Required clamping force and release gradients (high speed at low to medium torque).
3) Dosing the clamping force. For this purpose, relatively large forces and short distances are required, which means that the electric motor has to provide as great a torque as possible.
4) A required maximum clamping force. For the electric motor to be designed this means that it has to provide correspondingly high torque at low speeds.
5) Good reversing performance, which is required for traction control functions (e.g. anti-lock system, electronic driving stability control), also necessitates a correspondingly high motor torque.

These contrary requirements cannot at all or not optimally be fulfilled in the available space for the electric motor with the above-mentioned control known in the prior art

BRIEF SUMMARY OF THE INVENTION

It is an object of the present invention to propose a method and a system for controlling an electromechanically actuated brake that allows the above-mentioned criteria to be fulfilled. For this purpose, the speed of the electric motor is to be increased under certain operating conditions, i.e. depending on demand, without reducing the available torque.

This object shall be solved in that the slope of the speed-torque characteristic curve of the electric motor is influenced corresponding to the desired actuating force as well as the actuating force gradient or the values representing these signals.

In order to realize the concept of the invention, the slope of the speed-torque characteristic curve of the electric motor is changed in such a way the weaknesses of those components of the electromagnetic field that a higher speed is reached at the same torque. Hence, the advantage that the electric motor can be designed with a higher torque constant, meaning that the peak current, e.g. when reversing, and the continuous current during stationary clamping operations is reduced.

For this purpose, a torque-producing current value and a field-weakening current value are calculated, which are transformed into the currents to be supplied to the electric motor.

The torque-producing current value preferably is calculated by evaluating the desired and actual or present actuating force, whereas the field-weakening current value is calculated by evaluating the actual state as well as a desired state of the brake.

According to another advantageous feature of the method, the evaluation of the actuating force is based on force control.

The field-weakening current value is calculated by means of a quality criterion, whose input values are actuating force, actuating force variation and values that determine the working point in the characteristic curve of the electric motor.

A first embodiment of the control system according to the present invention that can execute the above-mentioned method is characterized in that:

a) an actuating force controller is provided, to which the difference between a desired and an actual value of the actuating force is supplied as the input value, with said actuating force controller generating the set value of the torque-producing current on the basis of this;

b) a calculating module is provided, to which the desired and actual value of the actuating force, the set value of the actuating force gradient or a value representing the actuating force gradient, the actual value of the motor position as well as signals representing the actual value and set value of the motor speed are supplied as input values, whereupon said calculating module generates the set value of the field-weakening current on the basis of these input values;

c) with the set values of both the torque-producing and field-weakening current as well as the signal representing the actual value of the motor position being transformed into a signal in a current control, which represents the voltage to be applied to the electric motor.

In advantageous preferred aspects of the first embodiment of the control system according to the present invention, the actuating force gradient as well as signals representing the actual value of the motor speed are additionally supplied to the actuating force controller.

A second embodiment of the control system according to the present invention for executing the above-mentioned method is characterized in that a) an actuating force controller is provided, to which the difference between a set value and an actual value of the actuating force is supplied as the input value, with said actuating force controller generating the set value of the motor speed on the basis of this;

b) the set value of the motor speed is compared to the actual value of the motor speed, and the difference reached thereby is supplied to a speed controller, which generates the set value of the torque-producing current therefrom;

c) a calculating module is provided, to which the desired and the actual value of the actuating force, the set value of the actuating force gradient, the actual value of the motor position as well as the signals representing the actual value of the motor speed are supplied as input values, with said calculating module generating the set value of the field-weakening current on the basis of these input values, d) with the set values of the torque-producing current and the field-weakening current as well as the signal representing the actual value of the motor position being transformed into a signal in an electronic current control, which represents the voltage to be applied to the electric motor.

In a third embodiment of the control system according to the present invention for executing the above-mentioned method, it is proposed that a) an actuating force controller be provided, to which the difference between a desired and an actual value of the actuating force is supplied as the input value with said actuating force controller generating a first set value of the motor speed on the basis of this;

b) a precontrol module be connected in parallel to the actuating force controller, and that the actual value of the actuating force as well as the set value of the actuating force gradient be supplied to such precontrol module as input values, with its output values corresponding to an additional set value of the motor speed as well as an additional set value of the torque-producing current;

c) the additional set value of the motor speed are added to the first set value of the motor speed and compared to the actual value of the motor speed, and that the difference arising therefrom is supplied to a speed controller, which generates the controlled set value of the torque-producing current on the basis of this;

d) the additional set value of the torque-producing current are added to said controlled set value, with the result of the addition being the set value of the torque-producing current;

e) a calculating module is provided, to which the desired and the actual value of the actuating force, the set value of the actuating force gradient, the actual value of the motor position as well as the signals representing the actual value of the motor speed are supplied as input values, with said calculating module generating the set value of the field-weakening current on the basis of the input values, f) and the set values of the torque-producing current and field-weakening current as well as the signal representing the actual value of the motor position are transformed into a signal in an electronic current control, with said signal representing the voltage to be applied to the electric motor.

Further details, features and advantages of the invention are provided in the following description of an embodiment, with reference to the enclosed drawings. The drawings are as follows:

DETAILED DESCRIPTION OF THE INVENTION

Figure 1:
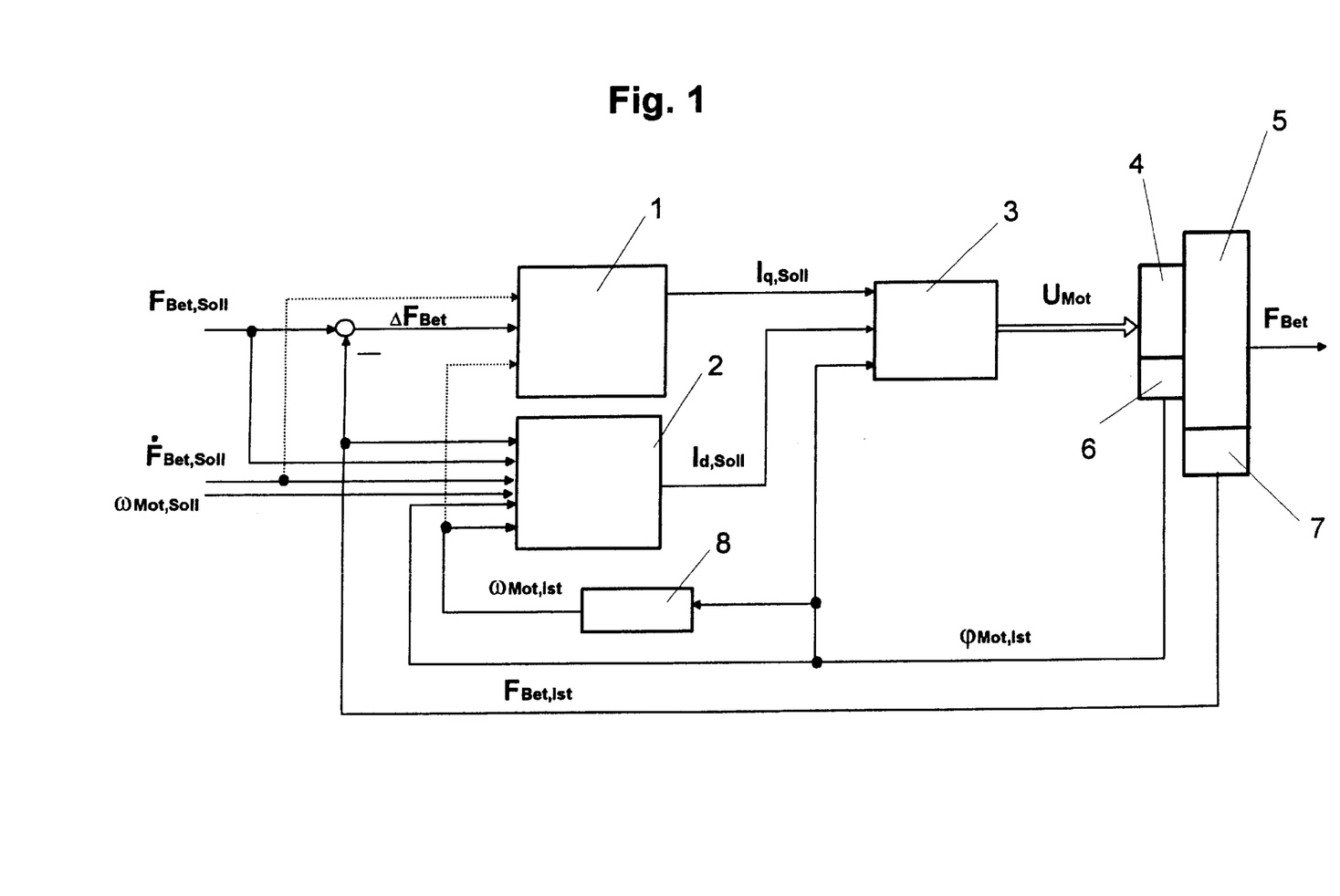
FIG. 1 is a block diagram of a control system for executing the method according to the present invention.

The control system shown in FIG. 1 essentially consists of an actuating force control module 1, a calculating module 2 connected in parallel to the actuating force control module 1 as well as a current control 3 arranged downstream of actuating force control module 1 and calculating module 2, whose output signal $U_{Mot,Soll}$, which corresponds to the set value of the motor voltage is used to control electric motor 4 (only shown schematically) of an electromechanically actuated brake, which is marked with reference number 5. Electric motor 4 preferably is provided with a position measuring system 6, whose output signal ($\omega_{Mot,Ist}$, which represents the actual position of the motor, is supplied to current control 3 as well as calculating module 2. In addition, the output signal ($\omega_{Mot,Ist}$ is subjected to time-differentiating processing in a differentiating circuit 8. The output signal of differentiating circuit 8, which corresponds to the actual value of the motor speed ($\omega_{Mot,Ist}$, is supplied to calculating module 2 as an additional input value.

The control system shown in FIG. 1 essentially consists of an actuating force control module 1, a calculating module 2 connected in parallel to the actuating force control module 1 as well as a current control 3 arranged downstream of actuating force control module 1 and calculating module 2, whose output signal $U_{Mot,\ Soll}$, which corresponds to the set value of the motor voltage, is used to control electric motor 4 (only shown schematically) of an electromechanically actuated brake, which is marked with reference number 5. Electric motor 4 preferably is provided with a position measuring system 6, whose output signal $\ddot{O}_{Mot,Ist}$, which represents the actual position of the motor, is supplied to current control 3 as well as calculating module 2. In addition, the output signal $\ddot{O}_{Mot,Ist}$ is subjected to time-differentiating processing in a differentiating circuit 8. The output signal of differentiating circuit 8, which corresponds to the actual value of the motor speed $\dot{U}_{Mot,Ist}$, is supplied to calculating module 2 as an additional input value.

As also shown in FIG. 1, the signals corresponding to the set values of the actuating force and the actuating force gradient, the actual value of the actuating force as well as the set value of the motor speed—$F_{Bet,Soll}$, $\dot{F}_{Bet,Soll}$, $F_{Bet,Ist}$, $\dot{U}_{Mot,Soll}$—are supplied to the above-mentioned calculating module 2 as additional input values. It is the task of calculating model 2 to generate a signal $I_{d,Soll}$ that corresponds to a share of the current that, as will be explained in detail below, will influence the slope of the torque-speed characteristic curve of the electric motor 4. The output signal of calculating module 2, which is provided to current control 3 as a second input value, corresponds to the set value $I_{d,Soll}$ of a share of the current which weakens the components of the electromagnetic field of the electric motor that change its torque-speed characteristic curve. Calculating module 2 preferably exhibits fuzzy logic, which contains decision criteria as to whether the field-weakening share of the current is to be applied. An example of the application could be overcoming the free travel.

The control of the above-mentioned electromechanically actuated brake 5 is based on a force control, wherein the set value for the actuating force to be set $F_{Bet,Soll}$ is specified by an operating element or a superior system unit. The set value for the actuating force to be set $F_{Bet,Soll}$ is compared with a signal $F_{Bet,Ist}$ corresponding to the actual value of the actuating force and the ensuing control deviation $\ddot{A}F_{Bet}$ is supplied to actuating force control module 1. Alternatively a signal $\dot{F}_{Bet,Soll}$ corresponding to the actuating force gradient as well as the above-mentioned signal $U_{Mot,Ist}$ corresponding to the actual value of the motor speed can be supplied to actuating force control module 1 as additional input values. For this purpose, the signal $F_{Bet,Ist}$ corresponding to the actual value of the actuating force preferably is supplied by force measuring element 7 that is shown only schematically. It can also be obtained with a method controlling the electromechanically actuated brake without sensors. The output signal of actuating force control module 1, which is made available as an input value to current control 3, corresponds to the set value $I_{q,Soll}$ of a torque-producing share of the current.

Figure 2:
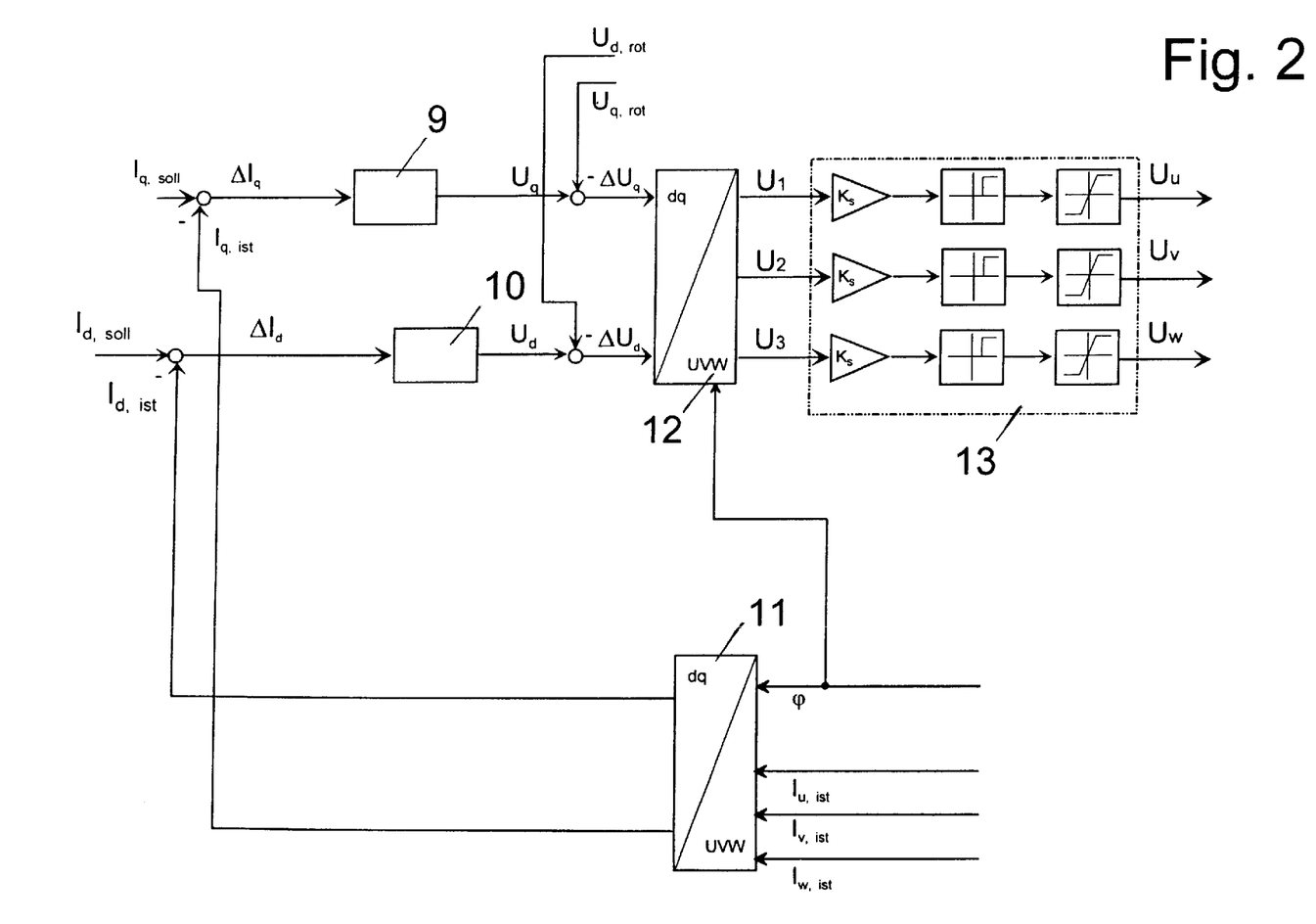
FIG. 2 shows the configuration of the current control for generating the desired motor voltage, which is applied in the control system according to FIG. 1.

The configuration of current control 3 mentioned in connection with FIG. 1 is illustrated in FIG. 2. As shown in the drawing, current control 3 essentially is made up of two controllers 9, 10, two transformation elements 11, 12 as well as a function block 13 for calculating the rotational voltages of the motor. The first controller 9 is supplied with the result $\ddot{A}I_q$ of a comparison between the set value of the torque-producing current $I_{q,Soll}$ and the actual value $I_{q,Ist}$, which is provided by the first transformation element 11. The output value $U_q$ of the first controller 9 is compared to a first rotational voltage $U_{q,rot}$ and the ensuing deviation $\ddot{A}U_q$ supplied to the first input of the second transformation element 12.

The result $\ddot{A}I_d$ of a comparison between the set value of the field-weakening current $I_{d,Soll}$ and an actual value $I_{d,Ist}$, which also is provided by the first transformation element, is supplied to the second controller 10. The output value $U_d$ of the second controller 10 is compared to a second rotational voltage $U_{d,rot}$ and the ensuing deviation $\ddot{A}U_d$ is supplied to the second input of the second transformation element 12.

The above-mentioned actual values of the torque-producing current $I_{q,Ist}$ as well as the field-weakening current $I_{d,Ist}$ are merely mathematical values; they are formed in the first transformation element 11 on the basis of the individual phase currents $I_u, I_v, I_w$ in electric motor 4 as well as the signal ö corresponding to the motor position, which represent real values. Also the values $\ddot{A}U_q$ and $\ddot{A}U_d$, which are supplied to the second transformation element 12, are merely mathematical values; they are used to form real voltage values $U_1, U_2, U_3$ in the transformation element 12, taking into account the motor position ö. The real voltage values $U_1, U_2, U_3$ are converted into set values of the phase voltages $U_u, U_v, U_w$ to be supplied to the electric motor corresponding to $U_{d,rot, Uq,rot}$.

Figure 3:
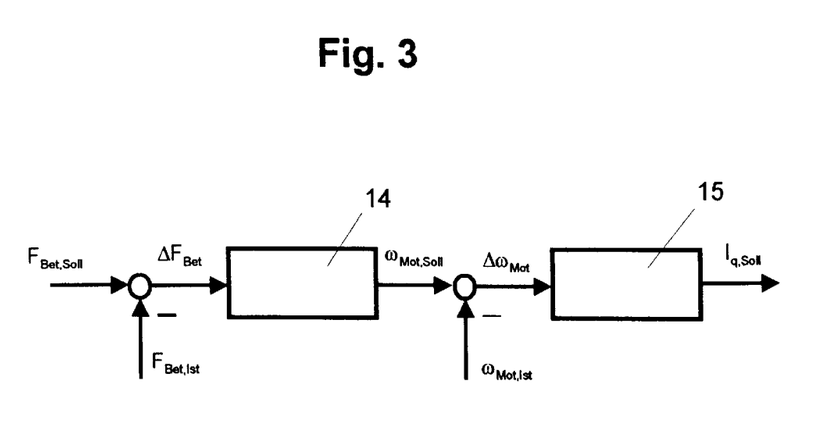
FIG. 3 shows a first embodiment of the actuating force module applied in the control system according to FIG. 1.

As already mentioned above, FIG. 3 shows a first embodiment of the actuating force control module 1 described in connection with FIG. 1. In the embodiment shown the control deviation $\ddot{A}F_{Bet}$ is converted into the set value of the motor speed $\grave{U}_{Mot,Soll}$ in an actuating force controller 14, with such value being compared to the actual value of the motor speed $\grave{U}_{Mot,Ist}$, and the result of the comparison $\ddot{A}\grave{U}_{Mot}$ is converted into the set value of the torque-producing share of the current $I_{q,Soll}$ in a speed controller 15 positioned downstream.

Figure 4:
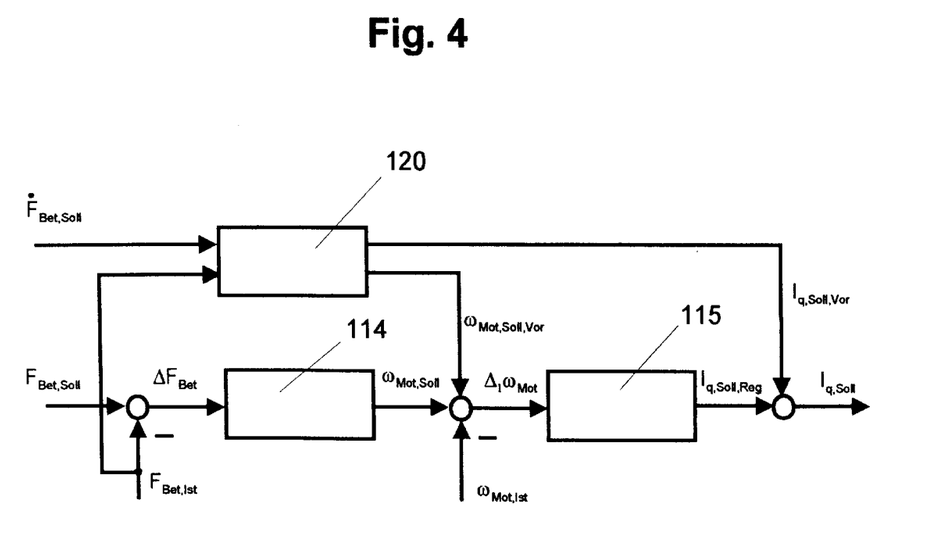
FIG. 4 is a second embodiment of the actuating force module applied in the control system according to FIG. 1.

In the second embodiment of the actuating force control module 1 shown in FIG. 4, a precontrol unit 120 is connected in parallel to the actuating force controller 114. The set value of the actuating force gradient $\dot{F}_{Bet,Soll}$ and the actual value of the actuating force $F_{Bet,Ist}$ are supplied to precontrol unit 120 as input values. On the one hand, precontrol unit 120 calculates a set value for the motor speed $\grave{U}_{Mot,Soll,Vor}$, which takes into account the system rigidity, on the basis of the aforementioned set value of the actuating force gradient $\dot{F}_{Bet,Soll}$ and, on the other hand, it calculates the set value of a torque-producing share of the motor current $I_{q,Soll,Vor}$ from the actual value of the actuating force $F_{Bet,Ist}$ which serves to compensate the influence of disturbances. The set value of the motor speed $\grave{U}_{Mot,Soll,Vor}$, is taken into account in the formation of the control deviation $\ddot{A}_1\grave{U}_{Mot}$, which is converted into the set value of a controlled torque-producing share of motor current $I_{q,Soll,Reg}$ in a downstream speed controller 115. The previously mentioned set value of the torque-producing share of motor current $I_{q,Soll,Vor}$ is added to the controlled torque-producing share of motor current $I_{q,Soll,Reg}$, with the result of the addition corresponding to the set value of the torque-producing share of motor current $I_{q,Soll}$ supplied to current control 3 (FIG. 1). In this connection, the configuration of the controllers 114, 115 mentioned in connection with FIG. 5 can be identical to the configuration of the controllers 14, 15 shown in FIG. 3.

Figure 5:
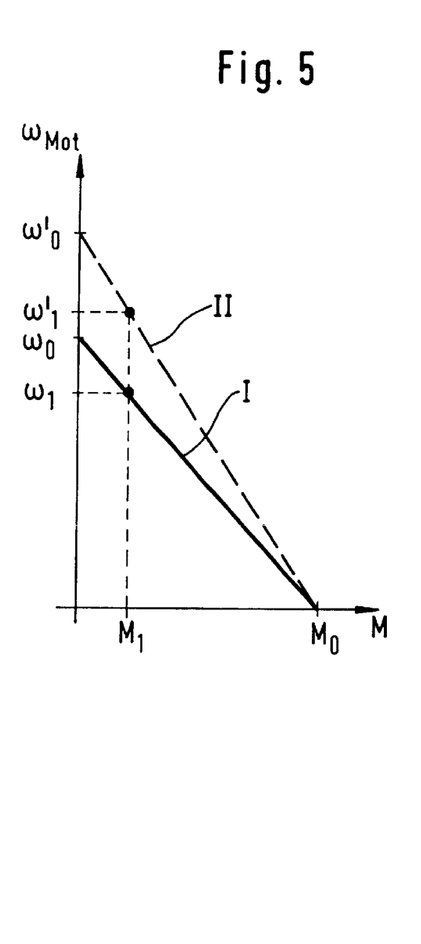
FIG. 5 shows the torque-speed characteristic curves of the electric motor according to FIG. 1.

To illustrate more clearly the effect of the field weakening, FIGS. 5 and 6 show the motor characteristic curves of the electric motor as well as typical time characteristics of a clamping procedure of an electromechanical brake.

In FIG. 5 solid Line I represents the characteristic curve of an electric motor not applying the method according to the present invention, i.e. no field-weakening measures are applied. The illustration shows that no motor torque is applied yet at idling speed $\grave{U}_0$. Whereas the motor torque corresponding to the speed value $\grave{U}_1$ is indicated by $M_1, M_0$ refers to the (maximum possible) standstill torque. The dotted characteristic curve II shows that the rise of the characteristic curve is changed by the effect of the field weakening in that an essentially higher motor idling speed $\grave{u}'_0$ is reached, so that also a higher speed $\grave{u}'_1$ corresponds to the aforementioned torque $M_1$, without reducing the standstill torque.

Figure 6A:
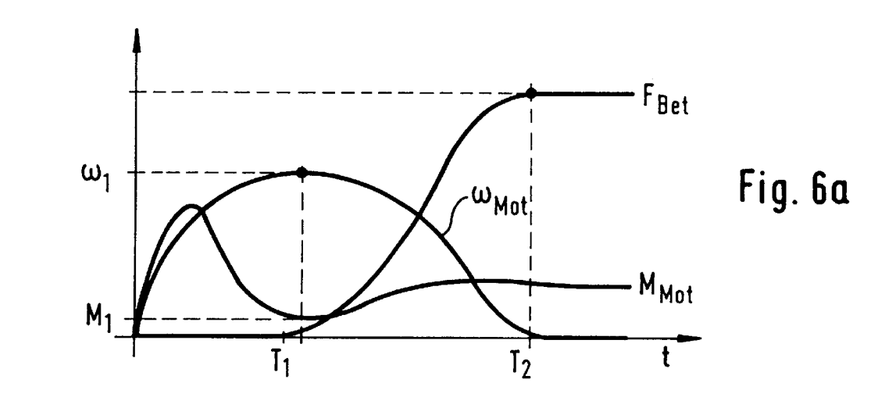
FIGS. 6a, b shows the time characteristics of the actuating force, motor torque and motor speed without and with the effect of the measure according to the present invention.
Figure 6B:
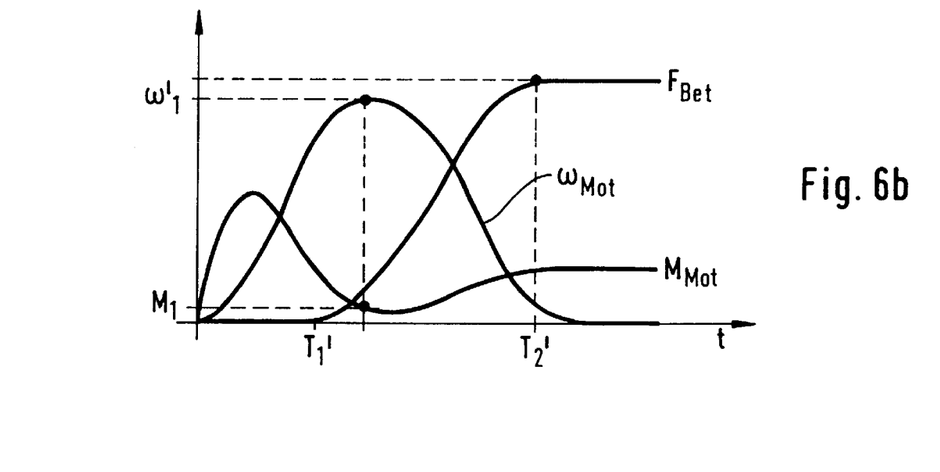

FIG. 6a shows the performance of the actuating force $F_{Bet}$, the motor speed $\grave{U}_{Mot}$ and the motor torque $M_{Mot}$ without field weakening. In general the motor torque is proportional to the torque-producing share of motor current and can be derived therefrom by means of the torque constants. FIG. 6a illustrates that the aforementioned free travel has been overcome at instant $T_1$ and the actuating force $F_{Bet}$ begins to increase. The desired target force is reached at instant $T_2$. FIG. 6b on the other hand shows the clamping procedure described above with suitable control of the electric motor when the aforementioned field weakening is executed. If one compares the processes shown in FIG. 6a and 6b, it becomes evident that the speed $\grave{u}'_1$ corresponding to the same value $M_1$ of the electric motor is considerably higher than the speed $\grave{u}_1$ shown in FIG. 6a. Due to the increase in speed achieved through the field weakening, the time interval $0\text{-}T_1$ shown in FIG. 6b, which is necessary to overcome the free travel, is considerably shorter than the time interval $0\text{-}T_1$ shown in FIG. 6a. The same holds true for the time interval $0\text{-}T_2$ which is needed to reach the target force.

What is claimed is:

1. A method for controlling a brake of a motor vehicle actuated electromechanically by an actuator having an electric motor and a drive mechanism positioned downstream of the electric motor, the electric motor exhibiting a speed-torque characteristic curve defined by design of the electric motor, the method comprising:

receiving a difference value indicative of a value between the difference of a desired value and an actual value of an actuating force ($F_{Bet,Soll}$) as an input value;

generating a set value ($I_{q,Soll}$) of a torque-producing current;

receiving the desired and actual values of the actuating force ($F_{Bet,Soll}$, $F_{Bet,Ist}$), a set value of an actuating force gradient ($F_{Bet,Soll}$), and signals representing an actual value ($\omega_{Mot,Ist}$) of a position of the electric motor and the actual value of the motor speed;

generating a set value ($I_{d,Soll}$) of a field-weakening current; and converting the set values of the torque-producing current and the field-weakening current as well as a signal representing a actual value ($\omega_{Mot,Ist}$) of the electric motor position to a signal ($U_{Mot}$) that represents a voltage to be applied to the electric motor, affecting a rise of the speed-torque characteristic curve of the electric motor.

2. The method according to claim 1 further comprising:

calculating set values of a torque-producing current and a field-weakening current; and converting the set values of the currents to voltages to be supplied to the electric motor.

3. The method according to claim 2 wherein calculating the set value of the field-weakening current is based on evaluating an actual state and a desired state of the brake.

4. The method according to claim 3 wherein calculating the set value of the field-weakening current includes calculating the set value of the field-weakening current based on a quality criterion of which input values include an actuating force, an actuating force variation, and values which determine an operating point in the characteristic curve of the electric motor.

5. The method according to claim 2 wherein calculating the set value of the torque-producing current includes evaluating the desired actuating force and a current actuating force.

6. The method according to claim 1 further comprising changing the slope of the speed-torque characteristic curve of the electric motor so that a higher speed is reached at the speed torque.

7. A system including an electric motor and a drive mechanism positioned downstream of the electric motor for controlling a brake actuated by an electric motor, the system comprising:

an actuating force control module (1) which receives a difference value indicative of a value between the difference of a desired value and an actual value of an actuating force ($F_{Bet,Soll}$) as an input value and generates a set value ($I_{q,Soll}$) of a torque-producing current; and a calculating module (2) which receives the desired and actual values of the actuating force ($F_{Bet,Soll}$, $F_{Bet,Ist}$), a set value of an actuating force gradient ($F_{Bet,Soll}$), and signals representing an actual value ($\omega_{Mot,Ist}$) of a position of the electric motor and the actual value ($\omega_{Mot,Ist}$) of a motor speed, wherein the calculating module generates a set value ($I_{d,Soll}$) of a field-weakening current, wherein the set values of the torque-producing current and the field-weakening current as well as the signal representing the actual value ($\omega_{Mot,Ist}$) of the motor position are converted by an electronic current control (3) to a signal ($U_{Mot}$) that represents the voltage to be applied to the electric motor (4).

8. A system according to claim 7, wherein the actuating force control module (1) receives an actuating force gradient signal corresponding to the actuating force gradient ($F_{Bet,Soll}$).

9. A system according to claim 7 wherein the actuating force control module (1) receives an actual value of the motor speed signal corresponding to the actual value of the motor speed ($\omega_{Mot,Ist}$).

10. A method of controlling a brake assembly actuated electromechanically by an actuator, the brake assembly including an electric motor and a drive mechanism positioned downstream the electric motor, the method comprising:

providing an actuating force controller to receive an input value representative of a difference value indicative of a value between the difference of a desired value and an actual value of an actuating force and to generate a set value therefrom;

providing a pre-control module connected and parallel to the actuating force controller, the pre-controller module being configured to receive the actual value of the actuating force and a set value of an actuating force gradient as input values, the pre-control module being configured to provide an additional set value of a motor speed and an additional set value of a torque-producing current as corresponding output values;

adding the additional set value of the motor speed to the set value of the motor speed;

supplying an ensuing difference to a speed controller to generate a controlled set value of the torque-producing current therefrom;

adding the additional set value of the torque-producing current;

with a calculating module, receiving the desired and actual values of the actuating force, the set value of the actuating force gradient, signals representing an actual value of a motor position, and an actual value of the motor speed;

generating a set value of a field-weakening current on the bases of the values received by the calculating module; and converting the set values of the torque-producing current, the set values of the field-weakening current, and the signals representing the actual value of the motor position to an electronic current control signal representing the voltage to be applied to the electric motor.

11. A system including an electric motor and a drive mechanism positioned downstream of the electric motor for controlling a brake actuated electromechanically by means of an actuator, the system comprising:
  an actuating force controller (14) to receive a difference value ($\Delta F_{Bet}$) indicative of a value difference between a desired value and a current value of an actuating force ($F_{Bet,Soll}$, $F_{Bet,Ist}$), the actuating force controller (14) being configured to generate a set value ($\omega_{Mot,Soll}$) of a motor speed and to compare the set value to an actual value ($\omega_{Mot,Ist}$) of the motor speed so that an ensuing difference ($\Delta\omega_{Mot}$) is supplied to a speed controller (15), which generates a set value ($I_{q,Soll}$) of a torque-producing current; and
  a calculating module (2) to receive the desired value and the current value of the actuating force ($F_{Bet,Soll}$, $F_{Bet,Ist}$), a set value of an actuating force gradient ($F_{Bet,Soll}$) from an operating element, signals representing an actual value ($\omega_{Mot,Ist}$) of a motor position from a position measuring system (6) and the actual value ($\omega_{Mot,Ist}$) of the motor speed from a force measuring element (7) to generate a set value ($I_{d,Soll}$) of a field-weakening current so that the set values ($I_{q,Soll}$, $I_{d,Soll}$) of the torque-producing current and the field-weakening current as well as the signal representing the actual value ($\omega_{Mot,Ist}$) of the motor position are converted in an electronic current control (3) to a signal ($U_{Mot}$) representing voltage to be applied to an electric motor (4).

* * * * *

UNITED STATES PATENT AND TRADEMARK OFFICE
CERTIFICATE OF CORRECTION

PATENT NO. : 6,550,871 B1
DATED : April 22, 2003
INVENTOR(S) : Jürgen Böhm et al.

It is certified that error appears in the above-identified patent and that said Letters Patent is hereby corrected as shown below:

<u>Title page,</u>
Item [22], delete "Jan. 18, 2000" and substitute -- Jan. 28, 2000 -- in its place.
Item [30], Foreign Application Priority Data, delete "199 06 909" and substitute -- 199 06 909.3 -- in its place; and delete "199 25 607" and substitute -- 199 25 607.1-- in its place.

<u>Column 7,</u>
Line 34, delete "($\omega_{Mot, Ist}$)" and substitute -- ($\varphi_{Mot, Ist}$) -- in its place.

<u>Column 8,</u>
Lines 8 and 16, delete "($\omega_{Mot, Ist}$)" and substitute -- ($\varphi_{Mot, Ist}$) -- in its place.

<u>Column 10,</u>
Lines 2 and 10, delete "($\omega_{Mot, Ist}$)" and substitute -- ($\varphi_{Mot, Ist}$) -- in its place.

Signed and Sealed this

Eleventh Day of November, 2003

JAMES E. ROGAN
*Director of the United States Patent and Trademark Office*